(12) United States Patent
Fuoco et al.

(10) Patent No.: US 6,594,713 B1
(45) Date of Patent: Jul. 15, 2003

(54) HUB INTERFACE UNIT AND APPLICATION UNIT INTERFACES FOR EXPANDED DIRECT MEMORY ACCESS PROCESSOR

(75) Inventors: Charles Fuoco, Allen, TX (US); David A. Comisky, Plano, TX (US); Sanjive Agarwala, Richardson, TX (US); Raguram Damodaran, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 547 days.

(21) Appl. No.: 09/637,492

(22) Filed: Aug. 11, 2000

Related U.S. Application Data
(60) Provisional application No. 60/153,192, filed on Sep. 10, 1999.

(51) Int. Cl.[7] ............................................. G06F 13/00
(52) U.S. Cl. ............................ 710/31; 710/36; 710/62; 710/129; 712/225; 709/250
(58) Field of Search ............................ 710/1, 15, 26, 710/31, 36, 62, 63, 107, 129, 104, 243, 22; 712/225; 709/250; 370/403

(56) References Cited
U.S. PATENT DOCUMENTS

| | | | | |
|---|---|---|---|---|
| 4,724,520 A | * | 2/1988 | Athanas et al. ............. 364/200 |
| 4,930,065 A | * | 5/1990 | McLagan et al. ............ 364/200 |
| 5,685,006 A | * | 11/1997 | Shiraishi ..................... 395/800 |
| 5,802,056 A | * | 9/1998 | Ferguson et al. ............ 370/403 |
| 6,219,725 B1 | * | 4/2001 | Diehl et al. .................... 710/26 |
| 6,314,047 B1 | * | 11/2001 | Keay et al. ............. 365/230.05 |
| 6,496,740 B1 | * | 12/2002 | Robertson et al. ............ 700/20 |

* cited by examiner

Primary Examiner—Jeffrey Gaffin
Assistant Examiner—RiJue Mai
(74) Attorney, Agent, or Firm—Robert D. Marshall, Jr.; W. James Brady, III; Frederick J. Telecky, Jr.

(57) ABSTRACT

An expanded direct memory access processor has ports which may be divided into two sections. The first is an application specific design referred to as the application unit, or application unit. Between the application unit and the expanded direct memory access processor hub is a second module, known as the hub interface unit hub interface unit which serves several functions. It provides buffering for read and write data, it prioritizes read and write commands from the source and destination pipelines such that the port sees a single interface with both access types consolidated and finally, it acts to decouple the port interface clock domain from the core processor clock domain through synchronization.

27 Claims, 13 Drawing Sheets

HUB INTERFACE UNIT AND APPLICATION UNIT INTERFACES FOR EXPANDED DIRECT MEMORY ACCESS PROCESSOR

CROSS REFERENCE TO RELATED APPLICATIONS

This application claims priority under 35 USC §119(e)(1) of Provisional Application No. 60/153,192, filed Sep. 10, 1999.

This application is related to the following patent applications:

U.K. Patent Application No. 09/543,870, filed Apr. 16, 1999, entitled TRANSFER CONTROLLER WITH HUB AND PORTS ARCHITECTURE;

U.S. patent application ser. No. 09/713,609, filed contemporaneously with this application, entitled EXPANDED (Attorney Docket No. TI-28977); and U.S. patent application Ser. No. 09/638,512, filed contemporaneously with this application, entitled CONFIGURATION BUS RECONFIGURABLE/REPROGRAMMABLE INTERFACE FOR EXPANDED DIRECT MEMORY ACCESS PROCESSOR.

TECHNICAL FIELD OF THE INVENTION

The technical field of this invention is digital device functional blocks, used in microprocessors and more specifically used in digital signal processors.

BACKGROUND OF THE INVENTION

The expanded direct memory access processor is the subject of U.S. patent application Ser. No. 09/713,609 filed contemporaneously with this application, entitled EXPANDED DIRECT MEMORY ACCESS PROCESSOR WITH HUB AND PORTS ARCHITECTURE. The expanded direct memory access processor provides a significant basic improvement in data transfer techniques in complex digital systems and allows, along with many other features, for uniform implementation of port interfaces at the periphery of such systems. The expanded direct memory access processor is an interconnection network which performs the task of communication throughout the processor system and its peripherals in a centralized function. Within the expanded direct memory access processor, a system comprised of a main hub and ports tied together by multiple pipelines is the medium for all data communications among processors and peripherals.

While the main hub controls the data transfers between the ports, processors or peripherals, the ports themselves control the actual device access. There are two types of ports, internal and external. Internal-ports connect to the local memory elements of processors located on the same chip as the expanded direct memory access processor. These internal ports communicate to the processor and/or on-chip memory. External ports connect to all the remaining peripherals through the external ports interface.

The external ports interface preferably used in a digital signal processor employing an expanded direct memory access processor is partitioned into two sections. These are the hub interface unit and the application unit. The interface between the hub interface unit and the application unit is the subject of this invention.

SUMMARY OF THE INVENTION

This invention relates to the operations and interconnections which are required for communication between the hub interface unit (HIU) and the application unit (AU) of the external ports of an expanded direct memory access processor. The hub interface unit handles this task, performing data buffering and frequency synchronization. This provides for the creation of very simple external peripherals, which do not require extensive buffers and buffer management. This also provides for these external peripherals to run at their own natural frequency, without need for their own synchronization to the internal interface.

The hub interface unit performs this synchronization by using the core clock frequency for the majority of its logic. The application unit clock frequency is used for the remaining application unit interface logic. The application unit performs all the peripheral access commands requested by the expanded direct memory access processor on behalf of the processors. The application unit receives commands from the hub interface unit and performs the required data read/write to the peripheral. This may require physically passing requests through I/O pins to an external device. The application unit may run at a single frequency since the hub interface unit handles synchronizing the commands and data to the expanded direct memory access processor frequency. Because the hub interface unit provides buffering, the application unit need not contain large buffers. This allows the application unit to simply retrieve requested data and deliver it to the hub interface unit immediately.

One aspect of this invention is the interface between the hub interface unit and application unit. The application units are designed to provide configurable peripherals to be connected to the expanded direct memory access processor without alteration to the extended direct memory access processor design. Any hub interface unit and any application unit communicate with each other in the same manner with the same interface of hardware and signal connections. In addition, configuration signals are passed from the application unit to the expanded direct memory access processor to define the configuration to which the expanded direct memory access processor must conform. This allows a single expanded direct memory access processor design to be re-used in a multitude of products which have separate and different peripheral sets.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
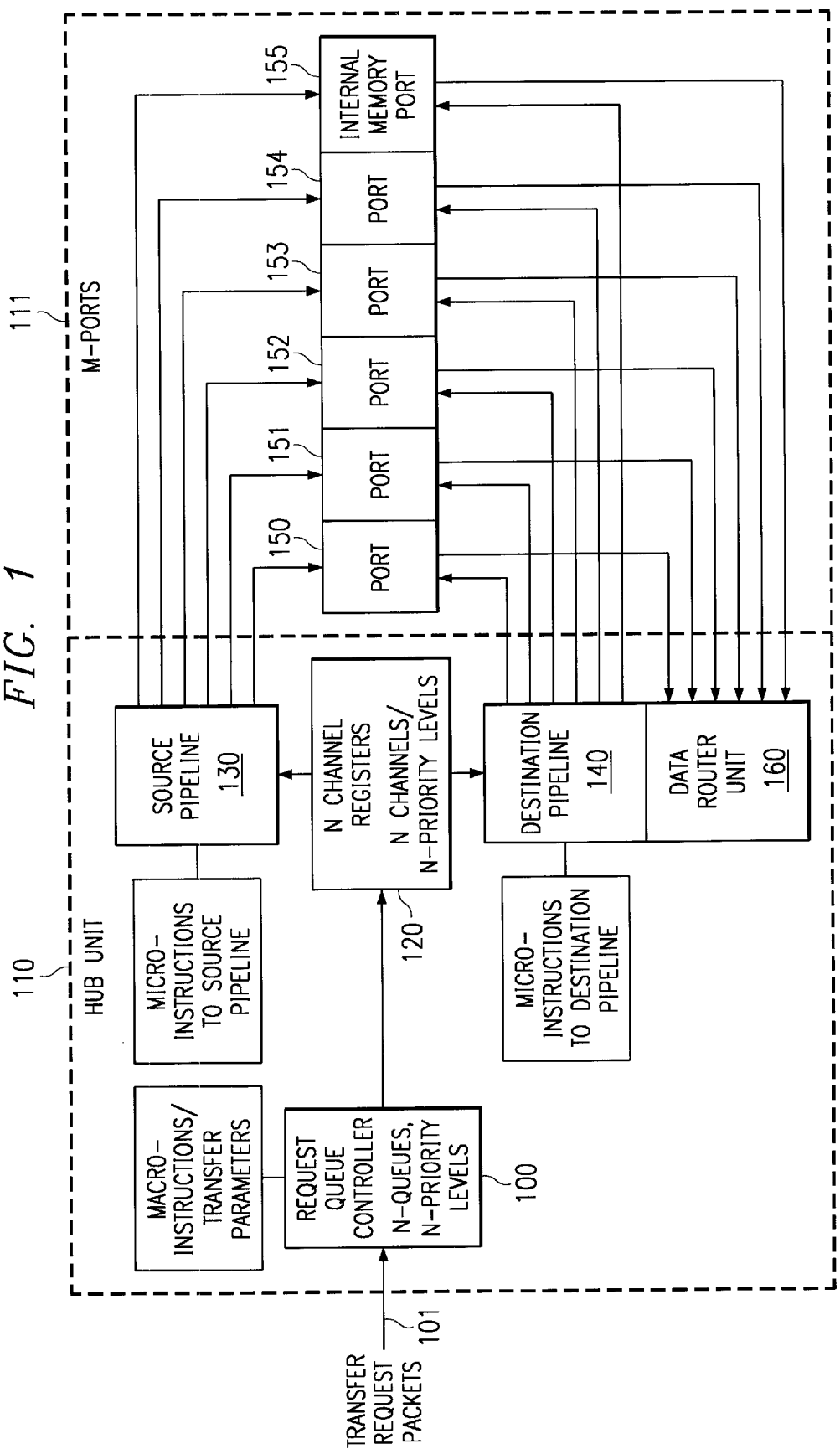
FIG. 1 illustrates a block diagram of the basic principal features of an expanded direct memory access processor with hub and ports architecture (EDMA) processor.

FIG. 1 illustrates a block diagram of the basic principal features of the expanded direct memory access processor. The extended direct memory access processor is basically a data transfer controller which has at its front end portion, a request queue controller 100 receiving, prioritizing, and dispatching data in the form of transfer request packets 101. The request queue controller 100 connects within the hub unit 110 to the channel registers 120 which receive the data transfer request packets and process them first by prioritizing them and assigning them to one of the N channels each of which represent a priority level. These channel registers interface with the source pipeline 130 and destination pipeline 140. These pipelines are address calculation units for source (read) and destination (write) operations.

Outputs from these pipelines are broadcast to M Ports 111. FIG. 1 illustrates six ports 150 to 155. Ports 150 to 155 are clocked either at the main processor clock frequency or at a lower (or higher) external device clock frequency. Read data from one port, for example port 150, having a destination write address of port 153 is returned to the hub destination control pipeline through the data router unit 160.

The ports 150 to 155 are divided into two sections. The application specific design (for example host port interface HPI or external memory interface EMIF) is referred to as the application unit (AU). A hub interface unit (HIU) connects the application unit and other parts of the expanded direct memory access processor.

The hub interface unit serves several functions. The hub interface unit provides buffering for read and write data to support the write driven processing. The hub interface unit prioritizes read and write commands from the source pipeline 130 and the destination pipeline 140 of the expanded direct memory access processor. The port sees a single interface with both access types consolidated. The hub interface unit decouples the external port interface clock domain from the core processor clock domain.

Figure 2:
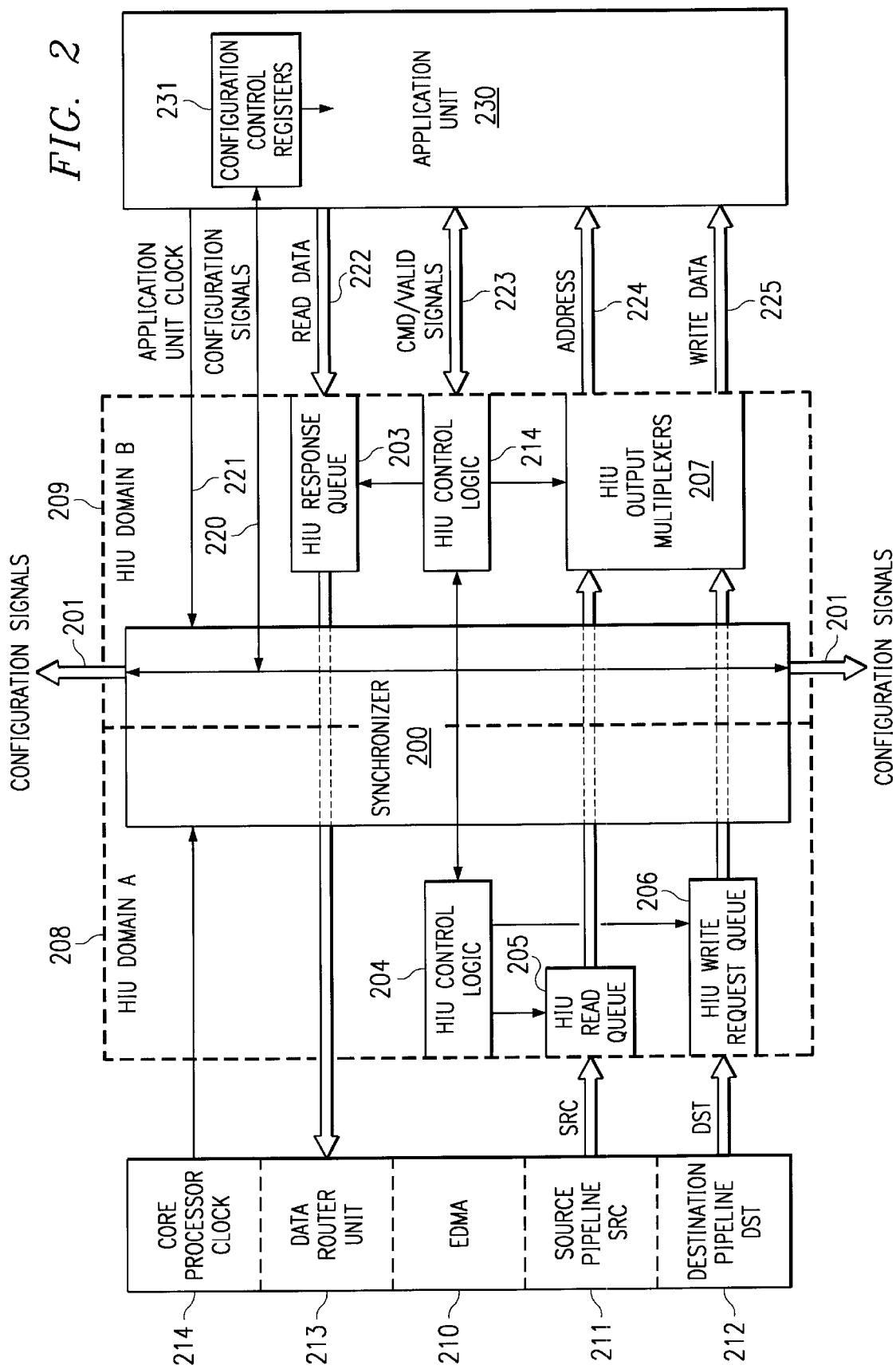
FIG. 2 illustrates a high-level block diagram of the hub interface unit (HIU)

FIG. 2 illustrates a high-level block diagram one of the ports 150 to 155 including a hub interface unit separated into clock domain A 208 and clock domain B 209. Clock domain A 208 operates at the rate of core processor clock 214 (Domain A). Clock domain B 209 operates at the rate of application unit clock 221 (Domain B). FIG. 2 also shows configuration signals 201 which originate from a configuration control bus which supplies configuration control data to all configurable devices including the application unit 230. Configuration operations are done prior to the actual application usage of the device. Configuration control hardware is normally dormant during normal application usage. The core functional blocks of the hub interface unit include in clock domain A: hub interface unit control logic block 204; hub interface unit read queue 205; hub interface unit write request queue 206; and include in clock domain B: hub interface unit control block 214; hub interface unit output multiplexers 207; and hub interface unit response queue 203. These core functional blocks of the hub interface unit pass data, commands, and status signals (e.g. valid, ack) between the hub on the expanded direct memory access processor side and the application unit on the port side.

Commands, address, and data information are sent from the hub to the read queue and write request queue of the hub interface unit. The hub interface unit control logic block 204 and hub interface control logic block 214 process this set of information and generate command, valid, and acknowledge signals which are sent to the application unit along with data in normal operation and configuration data during configuration cycles. In read operations the application unit 230 passes its read data, valid, and acknowledge signals to the hub interface unit.

The application unit interface is a custom designed functional block which has considerable variation in its construction between units designed for different external peripheral interfaces. This means that the control logic of an application unit may vary widely but the control signals and the interface provided by the hub interface unit is compatible with a wide variety of custom application unit requirements. The application unit data path structures also vary from one kind of peripheral interface to another.

Figure 3:
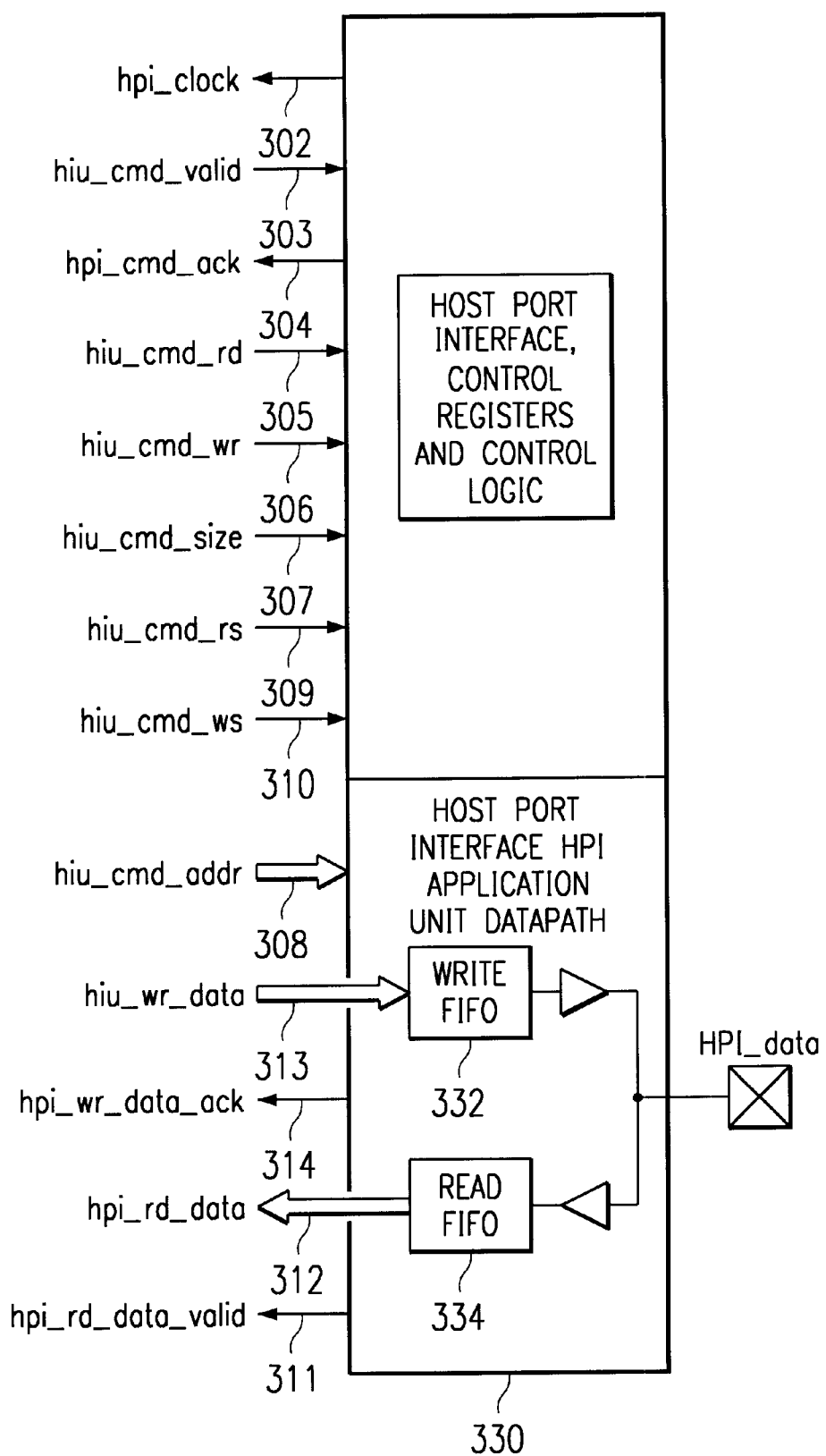
FIG. 3 illustrates a high level block diagram of the data path of a host port interface (HPI)
Figure 4:
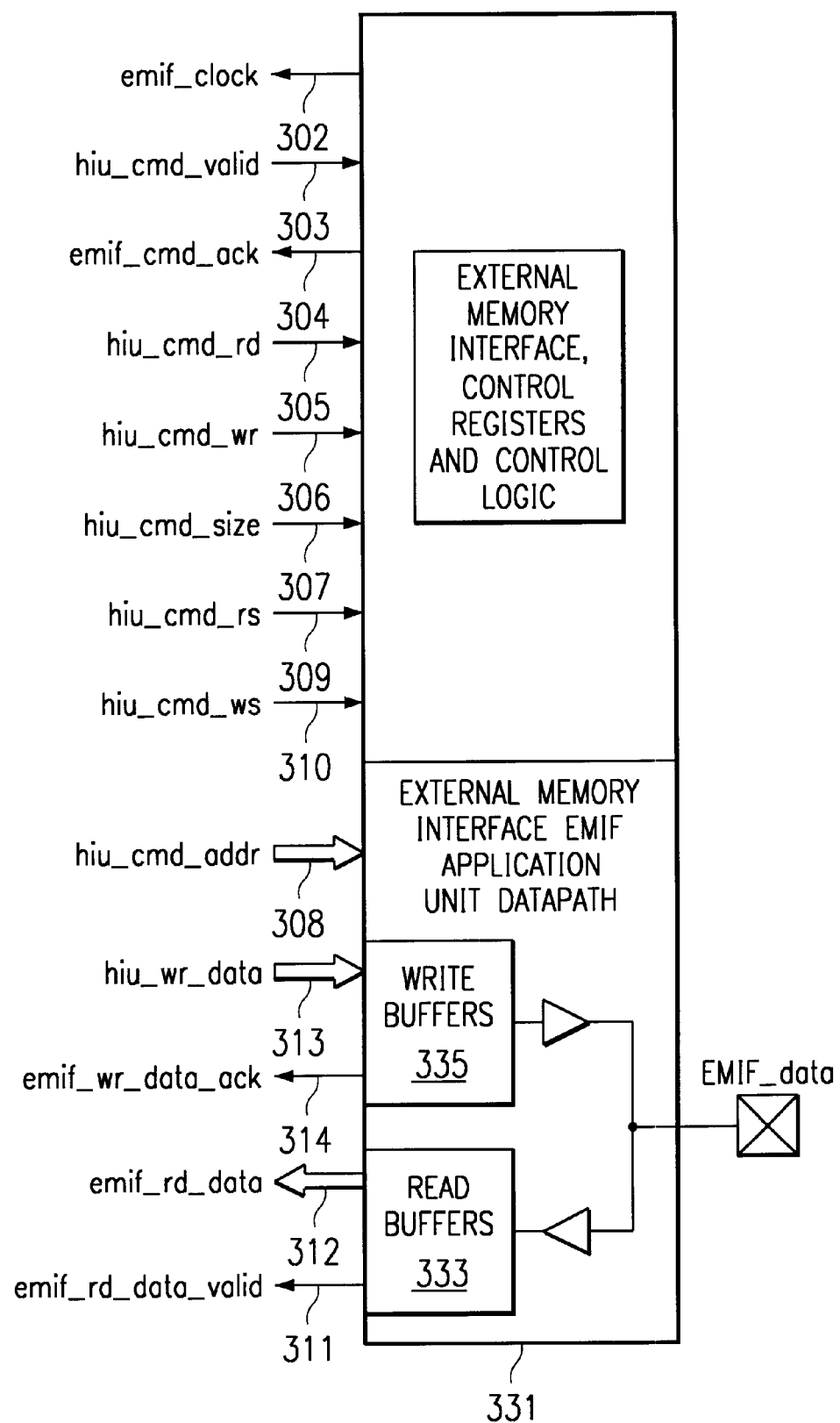
FIG. 4 illustrates a high level block diagram of the data path of an external memory interface (EMIF)

FIGS. 3 and 4 show the data path portion of two specific peripheral interface examples. FIG. 3 illustrates a first application unit for a host port interface (HPI) 330. FIG. 4 illustrates a second application unit for an external memory interface (EMIF) 331. In these figures corresponding signals have been given identical reference numbers while the signal names may differ.

FIG. 3 illustrates application unit 330 for a host port interface. The host port interface is an application unit which typically interfaces the hub interface unit to an external microcontroller function. The full complement of control signals provided for by the hub interface unit/host port interface combination is shown. These are: hpi_clock 302; hiu_cmd_valid 303; hpi_cmd_ack 304; hui_cmd_rd 305; hui_cmd_wr 306; hui_cmd_size 307; hui_cmd_addr 308; hui_cmd_rs 309; and hui_cmd_ws 310. The use of these signals will be described below in conjunction with a description of a generic application unit illustrated in FIG. 5. The host port interface type of application unit requires FIFO's 332 and 334 in its data path. Write data hiu_wr_data 313 flows to the host port interface via the write FIFO 332 during writes. Application unit 330 produces a write acknowledge signal hpi_wr_data_ack 314 indicating receipt of write data at the host port interface. Read data hpi_rd_data 312 flows from the host port interface via read FIFO 334 during reads. Application unit 330 produces a read data valid signal hpi_rd_data_valid 311 indicating receipt of valid data from the host port interface.

FIG. 4 illustrates application unit 331 for an external memory interface 331. The external memory interface is a type of application unit which typically provides support for several types of external memory and a wide variety of memory organizations. The full complement of control signals provided for by the hub interface unit/host port interface combination are: emif_clock 302; hiu_cmd_valid 303; emif_cmd_ack 304; hui_cmd_rd 305; hui_cmd_wr 306; hui_cmd_size 307; hui_cmd_addr 308; hui_cmd_rs 309; and hui_cmd_ws 310. The use of these signals will also be described below in conjunction with a description of a generic application unit illustrated in FIG. 5. The external memory interface type of application unit requires buffers 333 and 335 in its data path. Write data hiu_wr_data 313 flows to the external memory interface via the write buffers 335 during writes. Application unit 331 produces a write acknowledge signal emif_wr_data_ack 314 indicating receipt of write data at the external memory interface. Read data emif_rd_data 312 flows from the external memory interface via read buffers 334 during reads. Application unit 331 produces a read data valid signal emif_rd_data_valid 311 indicating receipt of valid data from the external memory interface. Write buffers 335 and read buffers 333 provide for a range of requirements on data path transfers on different memory types and structures.

Figure 5:
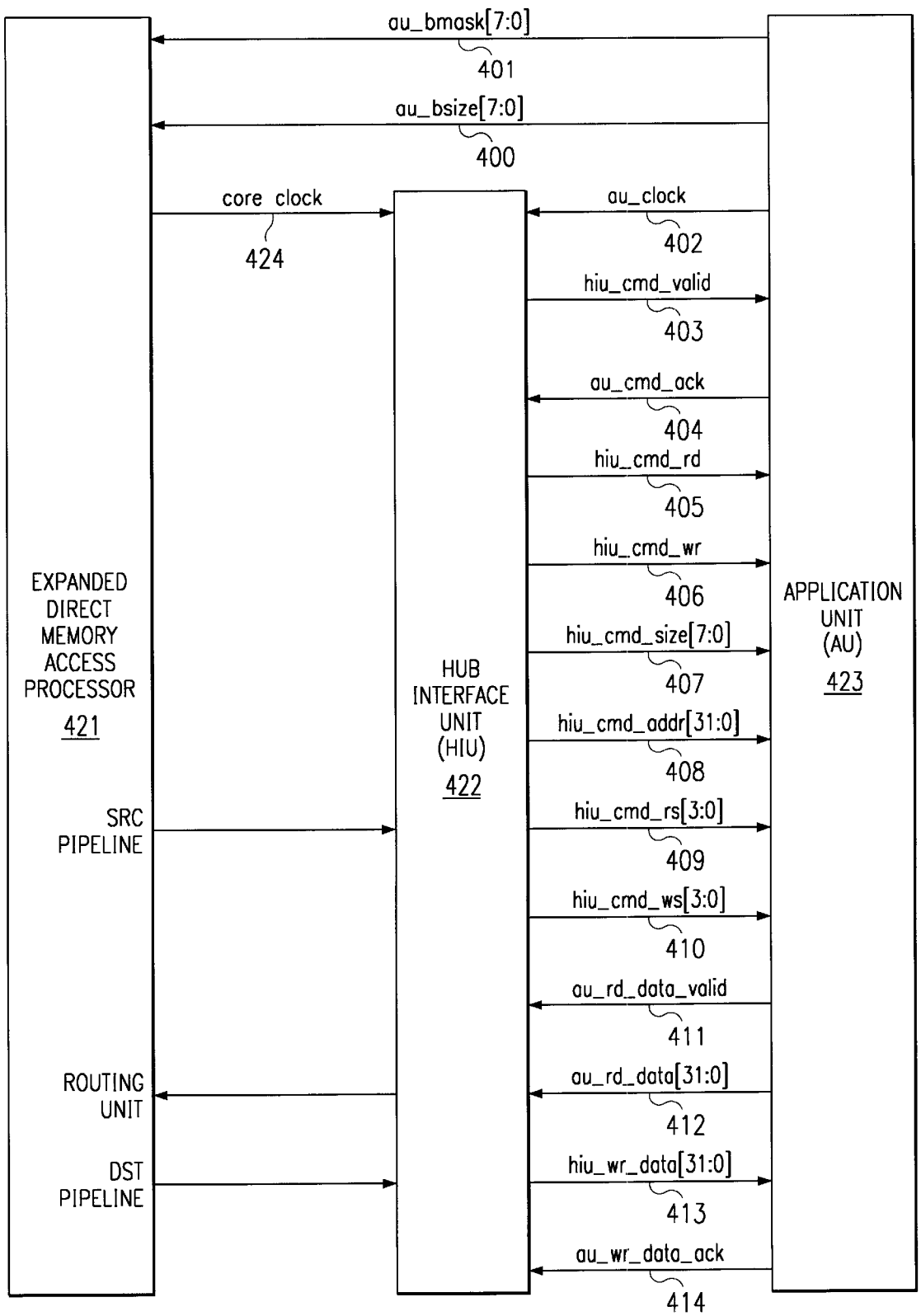
FIG. 5 illustrates a high level diagram of the signal flow between the hub interface unit, application unit and expanded direct memory access processor.

FIG. 5 illustrates a generic interface including expanded direct memory access processor 410, hub interface unit 422 and application unit 423. FIG. 5 illustrates a full set of signals which interface the extended direct memory access processor 421, hub interface unit 422 and application unit 423. In all types of external peripheral interfaces the application unit 423 must drive two specific configuration control signals to the expanded direct memory access processor 421 so that the extended direct memory access processor 421 knows what range of commands that peripheral can natively support.

The first of these is the signal au_bsize[7:0] 400. This is an 8-bit integer which determines the maximum number of data words (1 word=32 bits) the peripheral can successively transfer for a single expanded direct memory access processor command. This signal au_bsize 400 is the maximum data transfer size for the application unit 423 and peripheral. This signal au_bsize 400 may indicate a range from 1 to 255 words. Expanded direct memory access processor 421 uses this configuration signal to limit all of its commands to that application unit 423 to at most au_bsize 400 words. If the expanded direct memory access processor 421 requires a transfer larger than the au_bsize 400 allows, then it must break up the transfer into smaller transfers. Each of these smaller transfers is no larger than au_bsize 400 words.

The signal au_bsize 400, in addition to limiting the command size of commands from expanded direct memory access processor 421 to application unit 423, it also defines the natural transfer size for that application unit 423. This natural burst size can vary greatly, depending on the type of device/peripheral to which the application unit is connected. Serial ports that transfer one bit at a time would naturally use only one word at a time, while large latency memories would require bursts up to 32 words at a time while the memory row is accessed. The natural burst size allows the expanded direct memory access processor 421 to utilize the peripheral at its full rate, and not break up transfers into smaller numbers of words, which would underutilize application unit 423.

An additional signal au_bmask[7:0] 401 is a simple mask used inside the expanded direct memory access processor to assist in evaluating the maximum burst size (au_bsize 400) and in limiting command sizes. This 8-bit signal au_bmask 401 is derived from the signal au_bsize 400. The value of au_bmask 401 is simply one less than the value of au_bsize 400.

The hub interface unit/application unit interface always runs at the frequency defined by the application unit. The application unit 423 drives a clock signal au_clock 402 to the hub interface unit 422 to use as a reference clock for the entire interface. All other signals change with respect to the rising edge of the au_clock 402. All of the interface between application unit 423 and hub interface unit 422 must use this clock. If there are any other clocks, such as expanded direct memory access processor hub core clock 424 used in the hub interface unit or separate peripheral clocks used in application unit 423, then synchronization must be carried out in the respective block to convert the signals to the frequency of au_clock 402. This au_clock 402 allows any application unit 423 to be connected to hub interface unit 422, since hub interface unit 422 makes no assumption about the application unit frequency by using just the au_clock 402 signal.

Interface Commands

Hub interface unit 422 requests access to application unit 423 through commands based on commands received from expanded direct memory access processor 421. The sequence is as follows:

(1) A new command is sent to application unit 423 together with the hiu_cmd_valid signal 403. When hiu_cmd_valid signal 403 is high, a new command is ready for application unit 423 on the next occurrence of au_clock 402.

(2) Hub interface unit 422 will keep the command on the interface until the cycle after application unit 423 acknowledges receipt via a high on au_cmd_ack signal 404. When application unit 423 has evaluated the current command and no longer needs hub interface unit 422 to hold it, it asserts au_cmd_ack signal 404 high. Hub interface unit 422 will switch to the next command the next cycle of au_clock 402.

(3) The next cycle after receipt of the acknowledge signal au_cmd_ack 404, hub interface unit 422 can send a next command and keep hiu_cmd_valid 403 high, or drop hiu_cmd_valid 403 low if there are no more commands ready for application unit 423.

This sequence allows the application unit to accept commands quickly if the application unit is idle, or stall the hub interface unit by not returning au_cmd_ack 404 if the application unit is busy.

There are two types of commands hub interface unit 422 can request of application unit 423: a read command; or a write command. If hub interface unit 422 requires a read-.from application unit 423, then it sets hiu_cmd_rd 405 high and hiu_cmd_wr 406 low while the command is on the interface. If hub interface unit 422 requires a write from application unit 423, then it sets hiu_cmd_wr 406 high and hiu_cmd_rd 405 low while the command is on the interface.

Each command from hub interface unit 422 can be for any number of words up to the limit set by au_bsize 400. This limit is enforced by expanded direct memory access processor 421. Another control signal hiu_cmd_size[7:0] 407 determines how many words the command involves. This can be from one word up to the limit set by au_bsize 400. Application unit 423 is then expects to either read the number of words indicated by hiu_cmd_size 407 or to write the number of words indicated by hiu_cmd_size 407 in succession.

In addition, there are the four-bit byte strobe signals hiu_cmd_rs[3:0] 409 and hiu_cmd_ws[3:0] 410. Hub interface unit 422 must drive these signals to application unit 423 to declare which bytes are involved in the command. If the command is for one byte, then hub interface unit 422 drives one bit of the four-bit byte strobes signals active (high). This bit is the bit which corresponds to the requested byte. For reads, hub interface unit 422 drives the hiu_cmd_rs 409 and for writes hub interface unit 422 drives the hiu_cmd_ws 410 with the byte strobe value. If the request is for a halfword (2 bytes), then hub interface unit 422 drives the corresponding byte strobe signal with either the upper 2 bits or lower 2 bits high. When hub interface unit 422 is requesting a full word or multiple words, then it drives all the corresponding byte strobe signal bits all active (high) indicating that all bytes are being requested.

Interface Data

Figure 6:
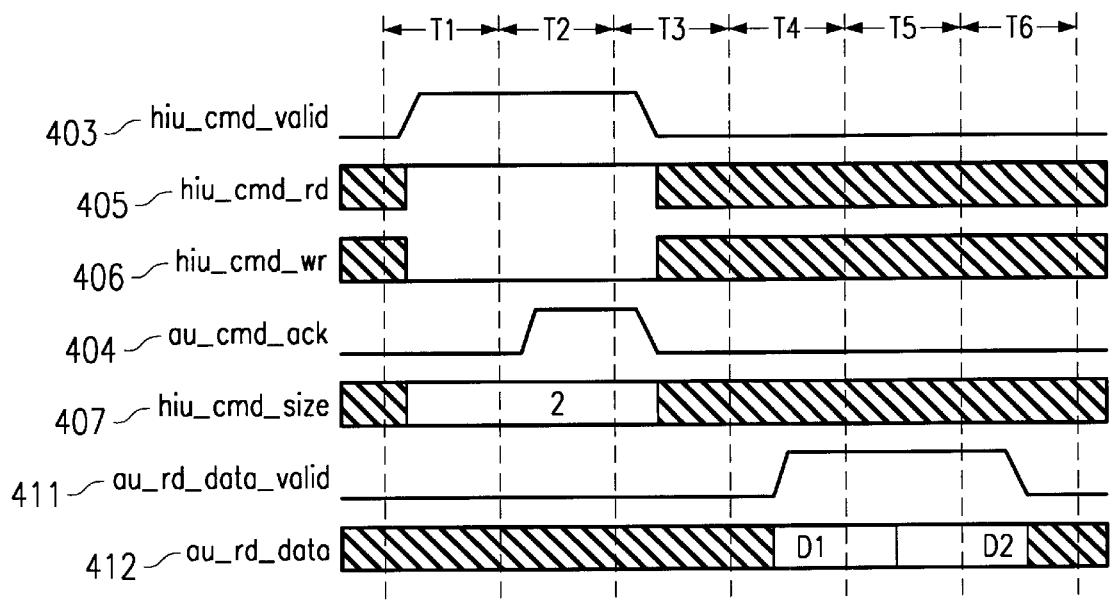
FIG. 6 illustrates the signal timing for an hub interface unit read command cycle.

FIG. 6 illustrates the signal timing for an hub interface unit read command cycle. Hub interface unit 422 signals the presence of a new command by driving the signal hiu_cmd_valid 403 active (high) at time cycle T1. Application unit 423 must first accept the command by asserting the signal au_cmd_ack 404 active (high). This is illustrated in FIG. 6 at time cycle T2. Once application unit 423 accepts the command from hub interface unit 422, it must return the requested read data back to hub interface unit 422. This is done by asserting the signal au_rd_data_valid 411 active (high) when the read data is ready. This is illustrated in FIG. 6 at time cycle T4. Also during time cycle T4, application unit 423 places the read data on the 32 bits of signal au_rd_data 412. Hub interface unit 422 will already be waiting for the read data, and will accept the read data in the same time cycle T4 that au_rd_data_valid 411 goes active (high).

If application unit 423 can transmit successive read data to hub interface unit 422 for a read burst, then it may leave a_rd_data_valid 411 high for the successive cycles (such as time cycle T5 illustrated in FIG. 6). Application unit 423 will change au_rd_data 412 each cycle to the current read word within the burst. After the number of requested data words (equal to hiu_cmd_size 407) has been returned to hub interface unit 422, application unit 423 is finished with that read command. Application unit 423 may use au_rd_data 412 for the next read command if that command is ready.

Figure 7:
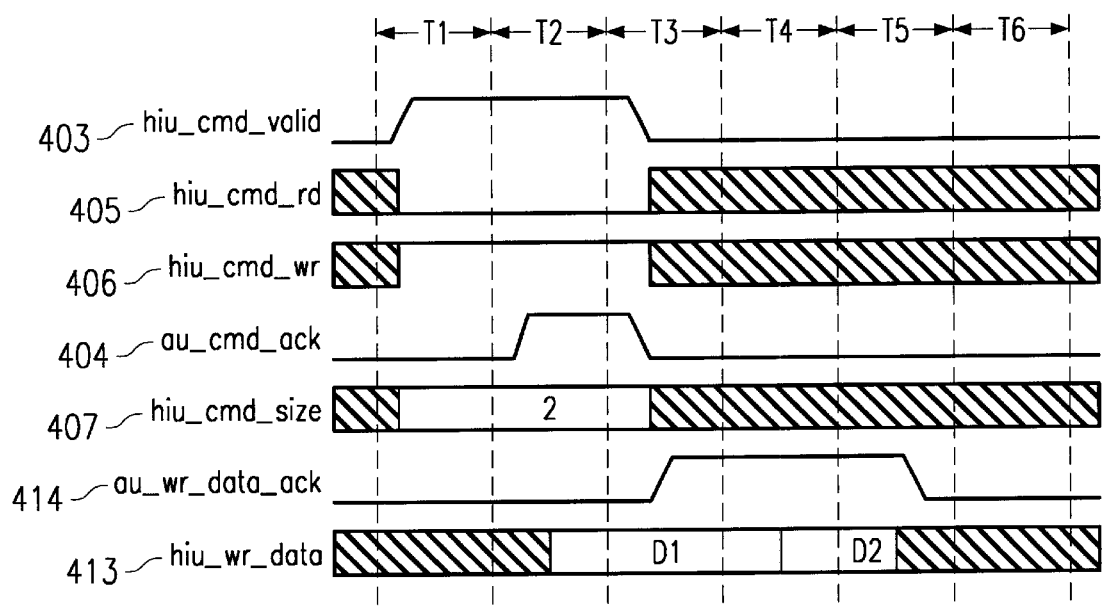
FIG. 7 illustrates the signal timing for an hub interface unit write command cycle.

FIG. 7 illustrates the signal timing for an hub interface unit write command cycle. Hub interface unit 422 signals the presence of a new command by driving the signal hiu_cmd_valid 403 active (high) in time cycle T1. Application unit 423 must first accept the command by asserting the signal au_cmd_ack 404 active (high). This is illustrated in FIG. 7 in time cycle T2. For hub interface unit 422 write commands, hub interface unit 422 places the first word of write data on the bus hiu_wr_data 413 during time cycle T2. This is the cycle after the write command is placed on the interface. This delay cycle allows hub interface unit 422 to retrieve the first data for that specific write when the write command finally proceeds to application unit 423.

Application unit 423 will not assume any write data is available the first cycle of a new write command from the hub interface unit as well. Once write data is placed on the hiu_wr_data[31:0] 413 bus by the hub interface unit, the application unit can accept the write data by asserting the au_wr_data_ack 414 high. If for some reason application unit 423 cannot accept the write data, then it would keep signal au_wr_13_data_ack 414 inactive (low). Thus hub interface unit 422 must keep the signal hiu_wr_data 413 valid on the bus for the next cycle.

Upon receiving the signal au_wr_data_ack 414 active (high), hub interface unit 423 will send the next write data on the bus hiu_wr_data 413 in the next time cycle. This is illustrated in FIG. 7 at time cycle T4. Hub interface unit 422 will continue to supply new data each cycle until it has sent the entire size of data of the write command. Application unit 423 will send a signal au_wr_data_ack 414 for each word of the write command.

For a series of commands, hub interface unit 422 and application unit 423 must follow the same rules as given above for reads or writes. Because hub interface unit 422 can pipeline the requests to application unit 423 before they complete, there are some additional requirements when considering multiple requests. First, all commands should be processed in application unit 423 in the order received from hub interface unit 422. In this way, ordering is preserved. Thus all read data must be returned in the correct order no matter how many outstanding reads still remain to be processed.

Figure 8:
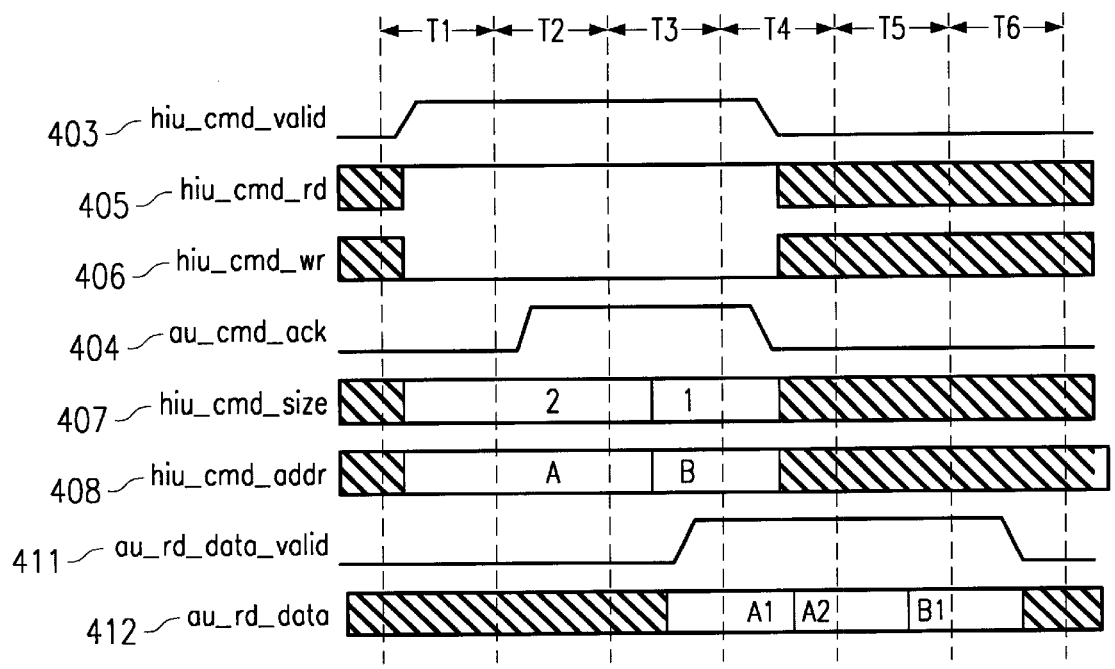
FIG. 8 illustrates the signal timing for an hub interface unit pipelined read command cycle.

This is illustrated in FIG. 8 where in time cycle T2 a size 2 read A is initiated and in time cycle T3 a separate size 1 read B is initiated. Application unit 423 processes the size 2 read completely and then proceeds to process the size 1 read as seen by the return of the signal au_rd_data 412 in the proper order.

Figure 9:
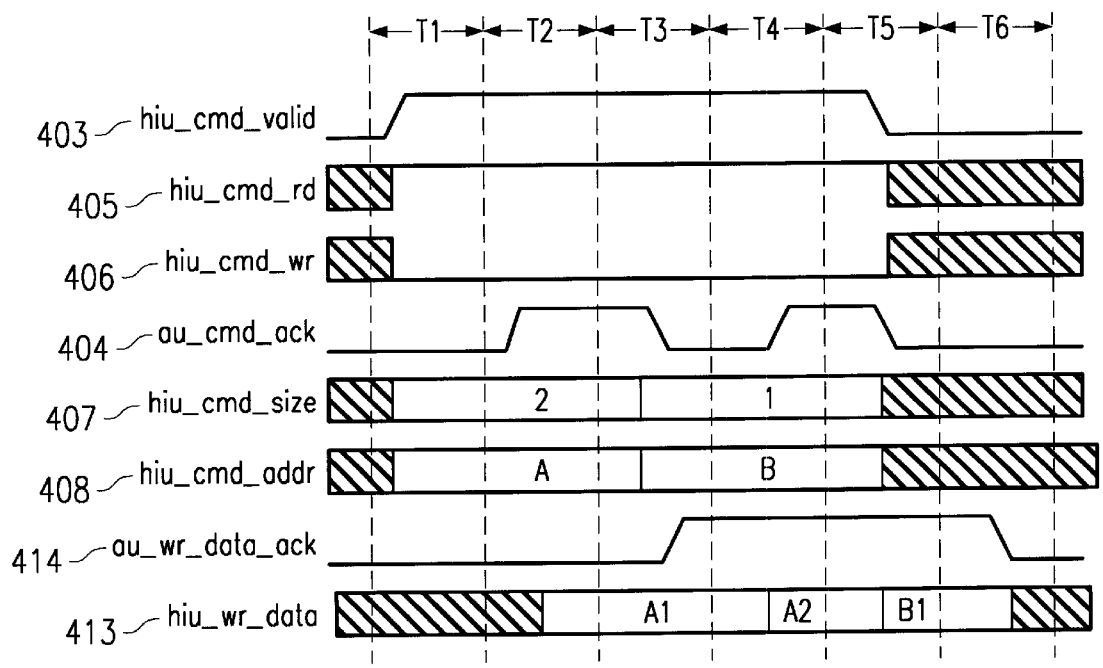
FIG. 9 illustrates the signal timing for an hub interface unit pipelined write command cycle.

FIG. 9 illustrates pipelining two write commands. When pipelining two write commands, application unit 423 cannot accept the second write command until the last data of the first write command has been read out of hub interface unit 422. This is illustrated in FIG. 9 where in time cycle T2 a size 2 write A is initiated and in time cycle T3 a separate size 1 write B is initiated. Application unit 423 receives the size 2 write completely and then proceeds to receive the size 1 write. This is seen by the sequence of the signal au_wr_data 413 in the proper order. These rules remove complications of having two outstanding writes with separate data to read allow hub interface unit 422 to operations to be simple at little cost to application unit 423.

Figure 10:
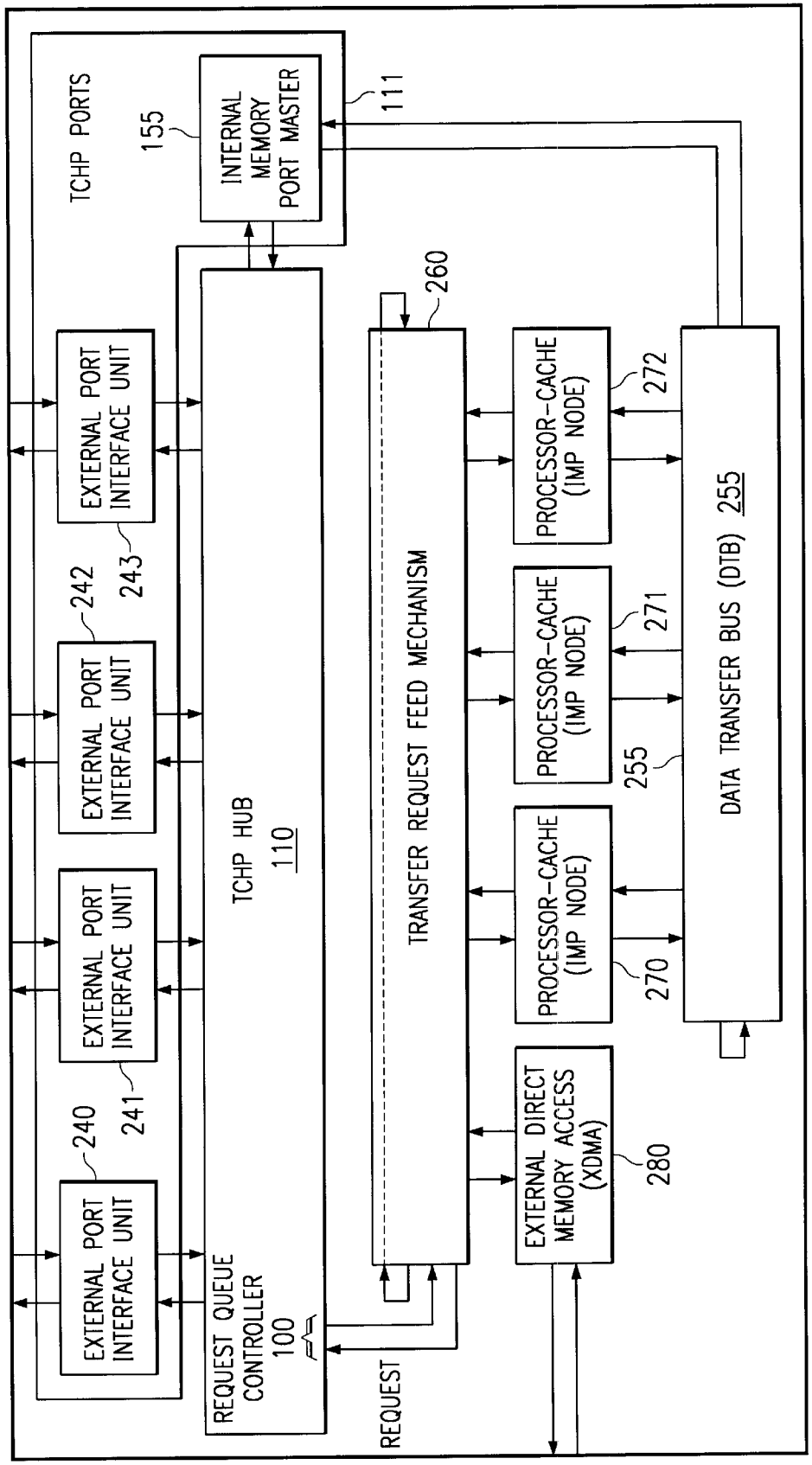
FIG. 10 illustrates a single integrated circuit including multiple processors and the transfer controller of this invention.

FIG. 10 illustrates from a higher level an overview of an multiprocessor integrated circuit employing the transfer controller with hub and ports of this invention. There are four main functional blocks. The transfer controller with hub and ports 110 and the ports including ports external port interface units 240 to 243 and internal memory port 250 are the first two main functional blocks. The other two main functional blocks are the transfer request feed mechanism 260 and the data transfer bus (DTB) 255. These are closely associated functional units that are but not a part of the transfer controller with hub and ports 110. Transfer request feed mechanism 260 is coupled to plural internal memory port nodes 270, 271 and 272. Each of these internal memory port nodes includes an independently programmable data processor, which may be a digital signal processor, and corresponding cache memory or other local memory. The internal construction of these internal memory port nodes is not important for this invention. For the purpose of this invention it sufficient that each of the internal memory port nodes can submit transfer requests via transfer request feed mechanism 260 and has memory that can be a source or destination for data. Transfer request feed mechanism 260 prioritizes these packet transfer requests in a manner not relevant to this invention. Transfers originating from or destined for internal memory port nodes 270, 271 or 272 are coupled to transfer controller with hub and ports 110 via data transfer bus 255 and internal memory port master 250. As previously described, internal memory port master 250 may not require the write driven process of this invention if internal memory port nodes 270, 271 and 272 have memory transfer bandwidth equivalent to the memory transfer bandwidth of transfer controller with hub and ports 110. FIG. 10 highlights the possible connection of data transfer bus 255 to multiple internal memory port nodes 270, 271 and 272 and the possible connection of multiple transfer request nodes to transfer request feed mechanism 260. This represents an example of the mode of use of the write driven process of this invention and not its only context of use.

Figure 11:
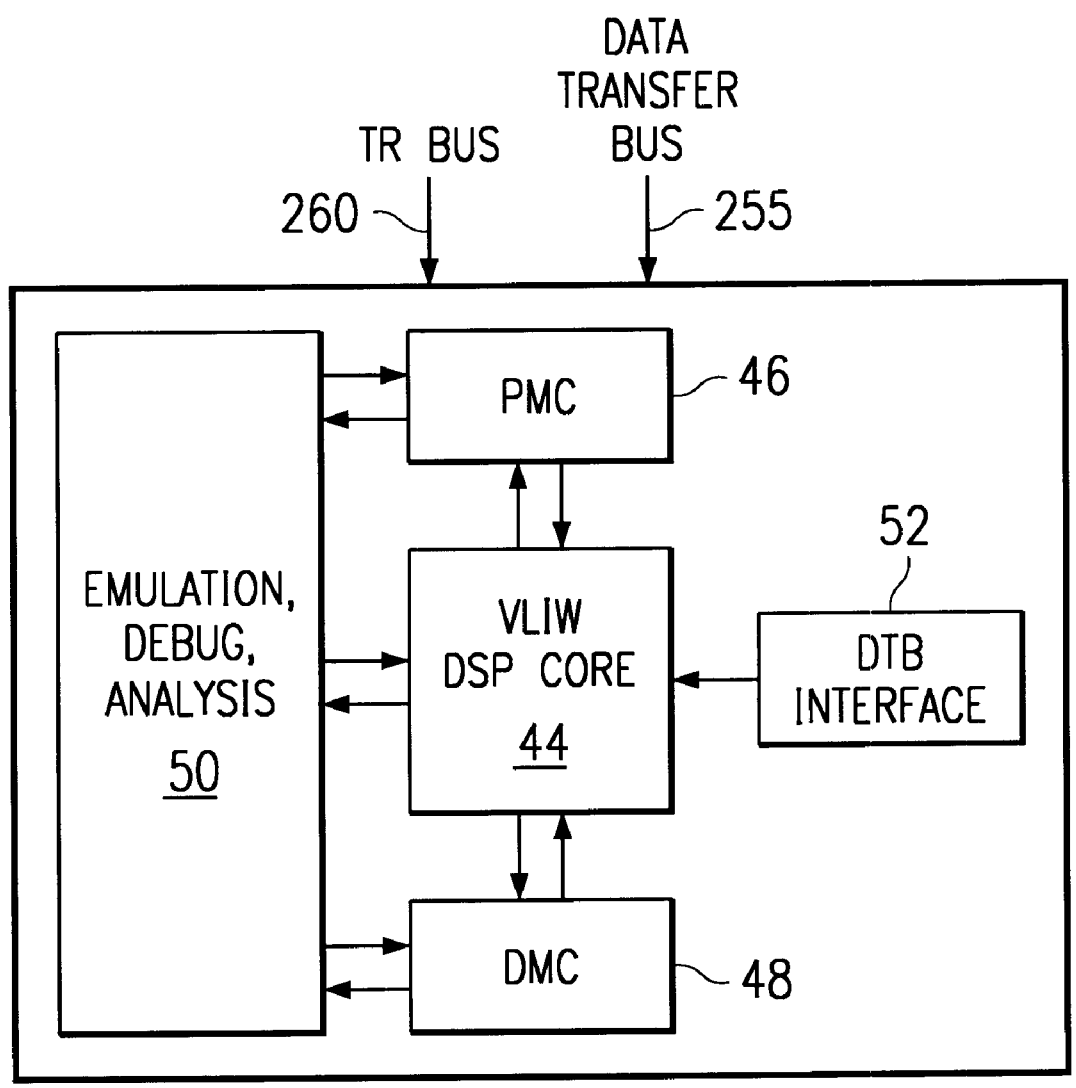
FIG. 11 illustrates a block diagram form an example of one of the multiple processors illustrated in FIG. 10.

FIG. 11 illustrates a block diagram of an example of a preferred processor and cache memory combination implementing the internal memory nodes 270, 271 and 272 of FIG. 10. This is designated as digital processing unit core 270 in FIG. 10. Each internal memory node 270, 271 and 272 preferably includes a digital signal processor core and corresponding instruction and data cache memory. Transfer controller with hub and ports 110 provides for all da a communication among internal memory nodes 270, 271 and 272, external input/output (I/O) devices and peripherals at external ports 240 to 243. Each internal memory node 270, 271 and 272 preferably comprises a very long instruction word (VLIW) digital signal processor core 44, program memory controller (PMC) 46, data memory controller (DMC) 48, an emulation, test, analysis and debug block 50, local memory and data transfer bus (DTB) interface 52. Internal memory nodes 270, 271 and 272 and transfer controller with hub and ports 110 communicate over a pair of high throughput buses. Transfer request feed mechanism 260 is used by digital signal processor cores 44 to specify and request transactions in transfer controller with hub and ports 110. Data transfer bus (DTB) 255 is used to load and store data from objects in the global memory map. While any given digital signal processor core 44 can access its own internal local memory within the cluster without permission from transfer controller with hub and ports 110, any access to global memory outside of its local memory requires a transfer controller directed data transfer, whether the access is to external memory or to another digital signal processor local memory. The overall architecture is scalable, allowing for the implementation of many internal memory nodes, although three is currently the preferred embodiment. It should be noted that architectural details, such as the number of digital signal processor cores, and their instruction set architectures are not essential to the invention. This microprocessor architecture is exemplary only, and the invention is applicable to many microprocessor architectures.

Figure 12:
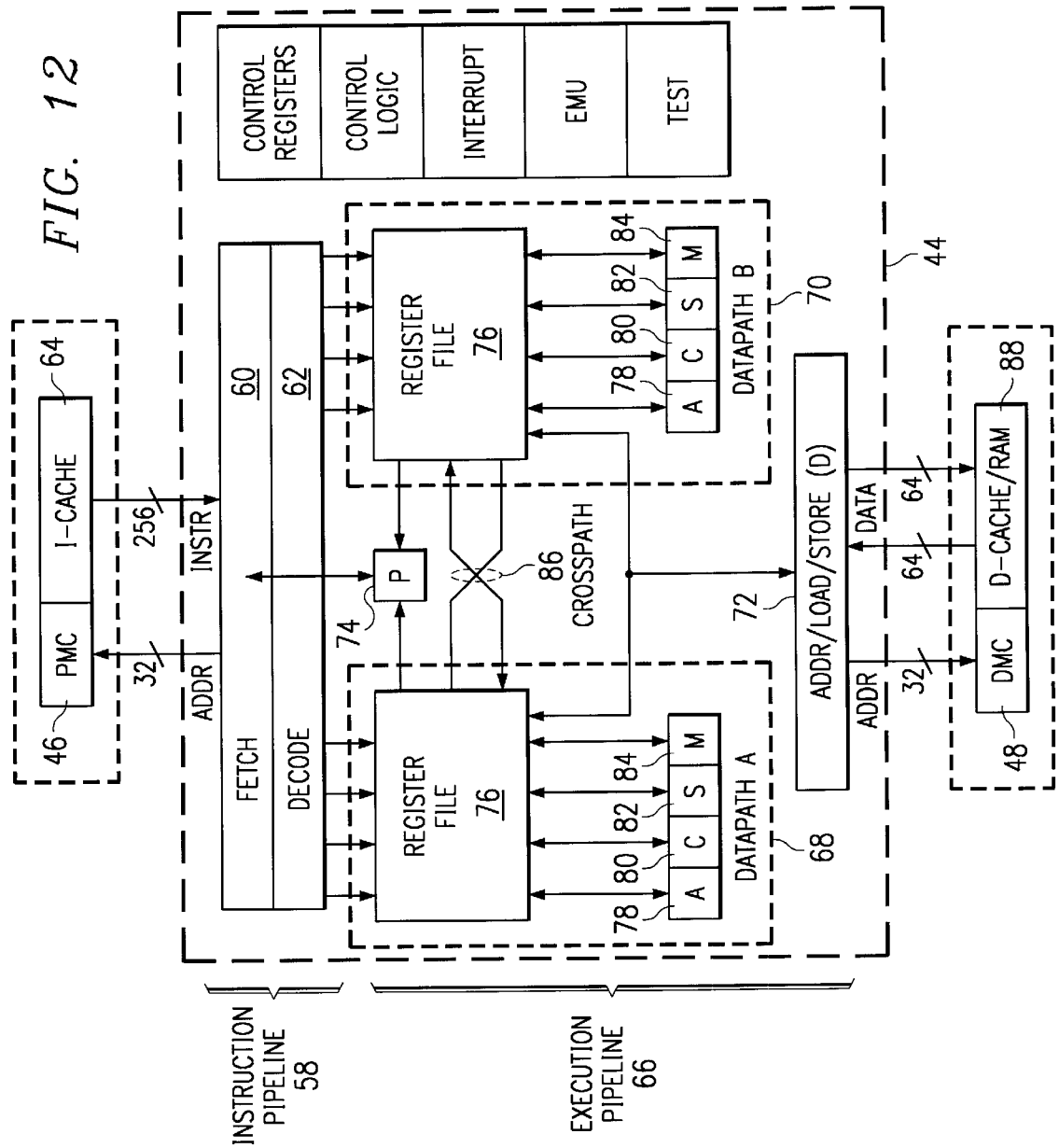
FIG. 12 illustrates further details of the very long instruction word digital signal processor core illustrated in FIG. 11.

FIG. 12 is a block diagram illustrating more detail of digital signal processor core 44 illustrated in FIG. 11. Digital signal processor core 44 is a 32-bit eight-way VLIW pipelined processor. The instruction set consists of fixed length 32-bit reduced instruction set; computer (RISC) type instructions that are tuned for digital signal processing applications. Almost all instructions perform register-to-register operations and all memory accesses are performed using explicit load/store instructions. As shown in FIG. 12, instruction pipeline 58 consists of fetch stage 60 and decode stage 62. Fetch stage 60 retrieves program codes into the processor core from instruction cache 64 under control of program memory controller 46 in groups of eight instructions called a fetch packet. Decode stage 62 parses the fetch packet, determines parallelism and resource availability and constructs an execute packet of up to, eight instructions. Each instruction in the execute packet is then translated into control signals to drive the appropriate units in execution pipeline 66. Execution pipeline 66 consists of two symmetrical data paths, data path A 68 and data path B 70, a common 64-bit load/store unit group D-unit group 72, and a common branch unit group P-unit group 74. Each data path contains 32-word register file (RF) 76, and four execution unit groups, A-unit group 78, C-unit group 80, S-unit group 82, and M-unit group 84. Overall there are ten separate unit groups in execution pipeline 66. Eight of these units may scheduled concurrently every cycle. Each functional unit group contains plural functional units, some of which are duplicated between unit groups. In total there are nine 32-bit adders, four 32-bit shifters, three Boolean operators, and two 32 bit by 16 bit, multipliers. The multipliers are each configurable into two 16 bit by 16 bit multipliers or into four 8 bit by 8 bit multipliers. The memory at internal memory nodes 270, 271 and 272 is preferably partitioned between instruction cache memory 64 controlled via program memory controller 46 and data cache memory and random access memory 88 controlled via data memory controller 48. These memory partitions are employed by digital signal processor core 44 in a conventional manner.

Each digital signal processor core 44 may request data transfers in is several ways. Digital signal processor core 44 may issue a data transfer request to transfer controller with hub and ports 110 in response to an explicit data transfer instruction. The data transfer instruction must specify the data source, the data destination and the data amount. These specifications may be by immediate fields in the instructions or by parameters stored in registers or memory. It is preferable that each digital signal processor core 44 be capable of requesting any data transfer that can be serviced by transfer controller with hub and ports 110. Thus any digital signal processor core 44 may transfer data internally or externally and load or read any internal memory node.

Each digital processor core 44 preferably also includes automatic mechanisms for generating requests for data transfer for cache service. Thus an instruction cache miss preferably causes program memory controller 46 to generate a data transfer request from another data source to fill a line of instruction cache 64 with data including program instructions stored at the address generating the cache miss. Similarly, a data cache miss on a data read preferably causes data memory controller 48 to generate a data transfer request to retrieve data to fill a line in data cache/random access memory 88 with corresponding data. These instruction and data are stored in a higher level of memory. This higher level of memory may be an on-chip combined cache used by all digital signal processor cores 44 or it may be external to the multiprocessor integrated circuit. There are two alternatives for data cache misses on data writes. In a write through mode, a data write by digital processor core 44 that misses data cache/random access memory 88 causes data memory controller 48 to generate a data transfer request to store the write data in the appropriate location in a higher level of memory. In a writeback mode, a data write by digital processor core 44 that misses data cache/random access memory 88 causes data memory controller 48 to generate a data transfer request to recall corresponding data in the appropriate location from a higher level of memory for storage in data cache/random access memory 88. The write data is then written into data cache/random access memory 88 overwriting the corresponding data just recalled from the higher level of memory. This process is referred to as write allocation within the data cache.

Data memory controller 48 preferably also employs a data transfer request to handle data write back to a higher level memory upon cache eviction of a dirty entry. A dirty cache entry includes data that has been modified since it was recalled from a higher level of memory. This modified data corresponds to a later state of the program than the data stored in the higher level of memory. When such data must be replaced to make room for new cache data, referred to as cache eviction, this dirty data must be written back to the higher level of memory to maintain the proper program state. Transfer controller with hub and ports 110 is preferably employed for this write back of evicted dirty cache entries.

Figure 13:
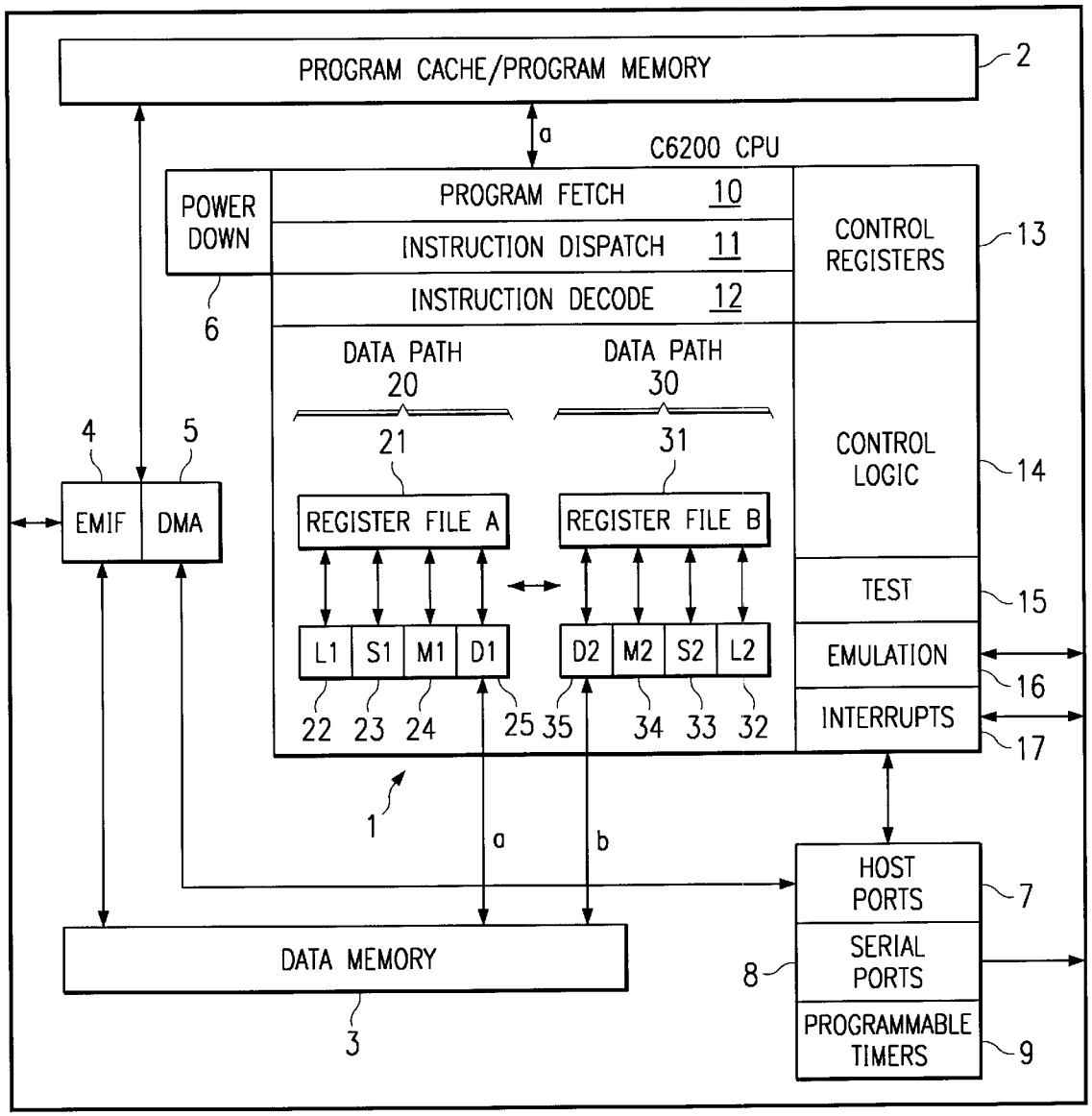
FIG. 13 illustrates further details of another very long instruction word digital signal processor core suitable for use in FIG. 11.

FIG. 13 is a block diagram illustrating details of an alternative digital signal processor cores 270, 271 and 272 of FIG. 10. Digital signal processor core of FIG. 13 is a 32-bit eight-way VLIW pipelined processor The digital signal processor includes central processing unit 1, shown in the right center portion of FIG. 13. Digital signal processor 270 includes program memory 2 which may optionally be used as a program cache. Digital signal processor core 270 may also have varying sizes and types of data memory 3. Digital signal processor 270 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals includes power-down logic 6. Power-down logic 6 preferably can halt central processing unit activity, peripheral activity, and phase lock loop (PLL) clock synchronization activity to reduce power consumption. These peripherals also includes host ports 7, serial ports 8 and programmable timers 9.

Digital signal processor core 270 has a 32-bit, byte addressable address space. Internal memory on the same integrated circuit is preferably organized in a data space including data memory 3 and a program space including program memory 2. When off-chip memory is used, preferably these two spaces are unified into a single memory space via the external memory interface (EMIF) 4.

Program memory 3 may be internally accessed by central processing unit 1 via two internal ports 3a and 3b. Each internal port 3a and 3b preferably has 32 bits of data and a 32-bit byte address reach. Program memory 2 may be internally accessed by central processing unit 1 via a single port 2a. Port 2a of program memory 2 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit registers forming register file 21. Second data path 30 likewise includes four functional units designated L2 unit 32, S2 unit 33, M2 unit 34 and D2 unit 35 and 16 32-bit registers forming register file 31. Central processing unit 1 includes control registers 13, control logic 14, and test logic 15, emulation logic 16 and interrupt logic 17.

Program fetch unit 10, instruction dispatch unit 11 and instruction decode 12 unit recall instructions from program memory 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 14A:
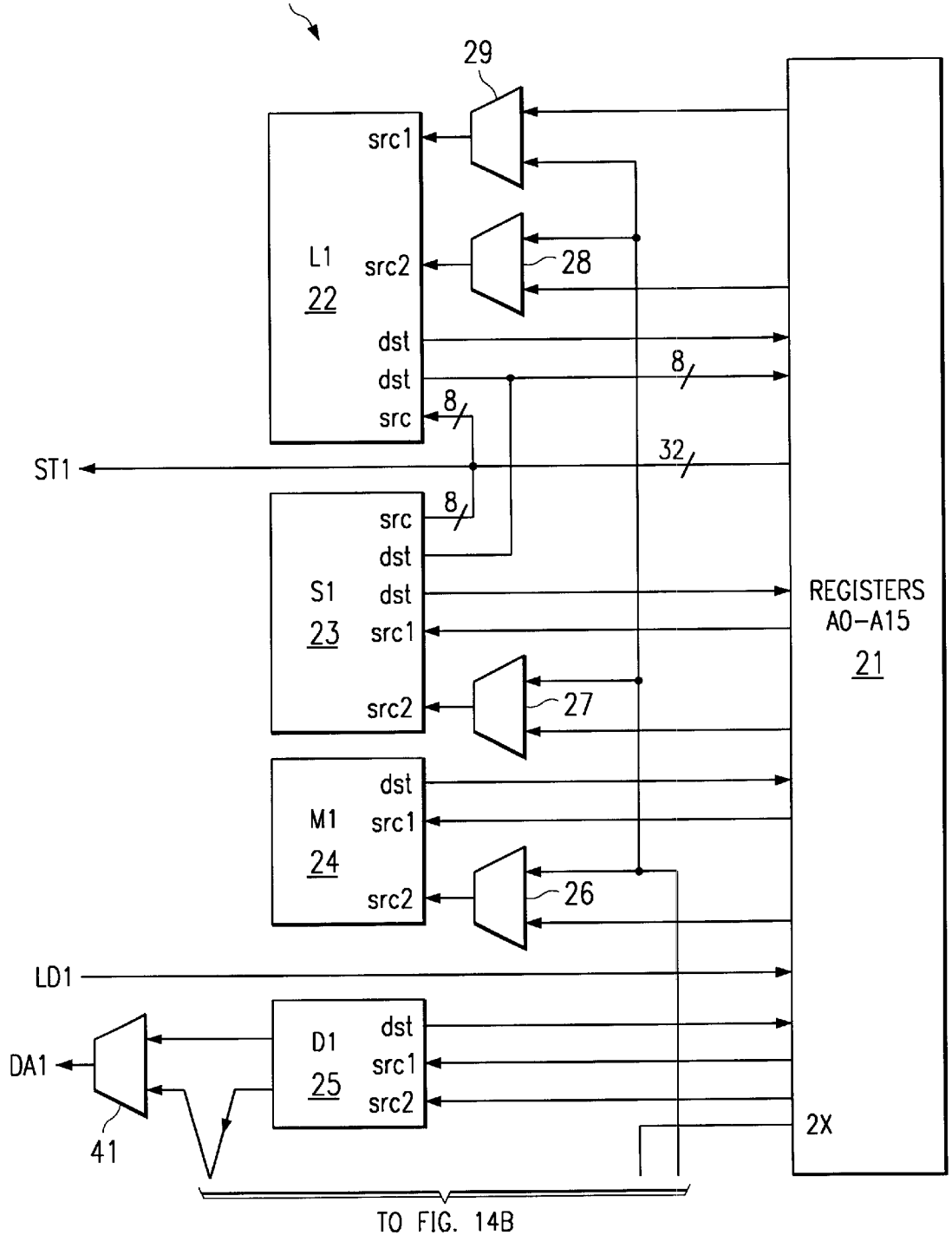
FIG. 14 illustrates additional details of the digital signal processor of FIG. 13.
Figure 14B:
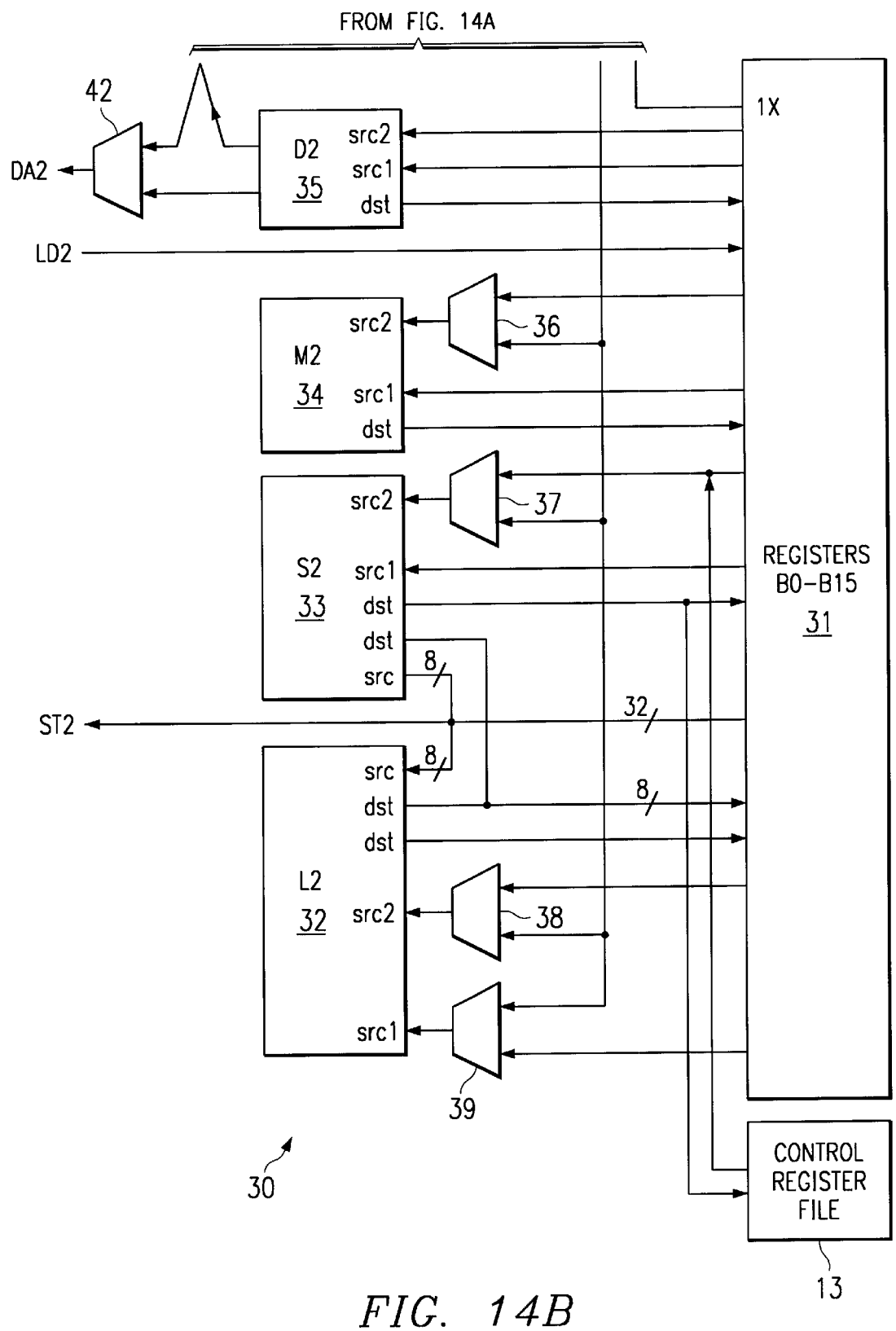

FIG. 14 illustrates the data paths of central processing unit 1. There are two general purpose register files 21 and 31. Each of general purpose register files 21 and 31 include 16 32-bit registers. These registers are designated registers A0 to A15 for register file 21 and registers B0 to B15 for register file 31. These general purpose registers can be used for data, data address pointers or as condition registers.

There are eight functional units L1 unit 22, L2 unit 32, S1 unit 23, S2 unit 33, M1 unit 24, M2 unit 34, D1 unit 25 and D2 unit 35. These eight functional units can be divided into two virtually identical groups of 4 (22 to 25 and 32 to 35) coupled to a corresponding register file. There are four types of functional units designated L, S, M and D. Table 1 lists the functional capabilities of these four types of functional units.

TABLE 1

Functional Units and Descriptions

| Functional Unit | Description |
| --- | --- |
| L Unit (L1, L2) | 32/40-bit arithmetic and compare operations<br>Left most 1, 0, bit counting for 32 bits<br>Normalization count for 32 and 40 bits<br>32 bit logical operations |
| S Unit (S1, S2) | 32-bit arithmetic operations<br>32/40 bit shifts and 32-bit bit-field operations<br>32 bit logical operations,<br>Branching<br>Constant generation<br>Register transfers to/from the control register file |
| M Unit (M1, M2) | 16 × 16 bit multiplies |
| D Unit (D1, D2) | 32-bit add, subtract, linear and circular address calculation |

Most data lines within central processing unit 1 support 32-bit operands. Some data lines support long (40-bit) operands.

Each functional unit has its own 32-bit write port into the corresponding general-purpose register file. Functional units L1 unit 22, S1 unit 23, M1 unit 24 and D1 unit 25 write to register file 21. Functional units L2 unit 32, S2 unit 33, M2 unit 34 and D2 unit 35 write to register file 31. As depicted in FIG. 14, each functional unit has two 32-bit read ports for respective source operands src1 and src2 from the corresponding register file. The four functional units L1 unit 22, L2 unit 32, S1 unit 23 and S2 unit 33 have an extra 8-bit wide write port for 40-bit long writes as well as an extra 8-bit wide read port for 40-bit long reads. Because each functional unit has its own 32-bit write port, all eight functional units can be used in parallel every cycle.

FIG. 14 illustrates cross register paths 1X and 2X. Function units L1 unit 22, S1 unit 23 and M1 unit 24 may receive one operand from register file 31 via cross register path 1X. Function units L2 unit 32, S2 unit 33 and M2 unit 34 may receive one operand from register file 21 via cross register path 2X. These paths allow the S, M and L units from each data path to access operands from either register file 21 or 31. Four functional units, M1 unit 24, M2 unit 34, S1 unit 23 and S2 unit 33, have one 32-bit input multiplexer which may select either the same side register file or the opposite file via the respective cross path 1X or 2X. Multiplexer 26 supplies an operand from either register file 21 or register file 31 to the second source input src2 of M unit 24. Multiplexer 36 supplies an operand from either register file 21 or register file 31 to the second source input src2 of M unit 34. Multiplexer 27 supplies an operand from either register file 21 or register file 31 to the second source input src2 of S unit 23. Multiplexer 37 supplies an operand from either register file 21 or register file 31 to the second source input src2 of S unit 33. Both, the 32-bit inputs of function units L1 unit 22 and L2 unit 32 include multiplexers which may select either the corresponding register file or the corresponding cross path. Multiplexer 28 supplies the first source input src1 of L unit 22 and multiplexer 29 supplies the second source input src2. Multiplexer 38 supplies the first source input src1 of L unit 32 and multiplexer 39 supplies the second source input src2.

There are two 32-bit paths for loading data from memory to the register file. Data path LD1 enables loading register file A and data path LD2 enables loading register file B. There are also two 32-bit paths for storing register values to memory from the register file. Data path ST1 enables storing data from register file A to memory and data path ST2 enables storing data from register file B to memory. These store paths ST1 and ST2 are shared with the L unit and S unit long read paths.

FIG. 14 illustrates two data address paths (DA1 and DA2) coming from respective D units 25 and 35. These data address paths allow supply of data-addresses generated by the D units to specify memory address. D unit 25 and D unit 35 each supply one input to address multiplexers 41 and 42. Address multiplexers 41 and 42 permit D unit 25 to support loads from memory to either register file 21 or register file 31 and to support stores from either register file 21 or register file 31 to memory. Address multiplexers 41 and 42 likewise permit D unit 35 to support loads and stores involving either register file 21 or register file 31.

FIG. 13 illustrates data paths enabling S2 unit 33 to read from and to write to the control register file 13.

What is claimed is:

1. A data transfer controller comprising:
a data transfer hub connected to dispatch data transfer requests specifying a data source, a data destination and a data quantity to be transferred;
a plurality of ports each connected to said data transfer hub and including
an hub interface unit connected to said data transfer hub, said hub interface unit for each port being identically configured, and
an application unit interface connected to said corresponding hub interface unit and configured for an external memory/device expected to be connected to said port, said hub interface unit and said application unit interface operatively connected for data transfer therebetween by a predetermined set of interface signal lines identical for all ports; and
said data transfer hub controlling data transfer from a source port corresponding to said data source to a destination port corresponding to said data destination in a quantity corresponding to said data quantity to be transferred of a currently executing data transfer request.

2. The data transfer controller of claim 1, wherein:
said data transfer hub is clocked at first frequency;
said application unit interface of each of said plurality of ports is clocked at second frequency corresponding to the external memory/device expected to be connected to said port; and
said hub interface unit of each of said plurality ports includes
a first clock domain clocked at said first frequency,
a second clock domain clocked at said second frequency of said corresponding application unit interface, and
a synchronizer connected to said first clock domain and said second clock domain operative to synchronize signals passing between said first clock domain and said second clock domain.

3. The data transfer controller of claim 2, wherein:
said hub interface unit further includes a write request queue disposed in said first clock domain, said write request queue storing write requests directed to the external memory/device expected to be connected to said port, said write request queue transmitting write requests to the external memory/device expected to be connected to said port via said application unit interface following acknowledgement of receipt of a last previous command.

4. The data transfer controller of claim 2, wherein:
said hub interface unit further includes a read request queue disposed in said first clock domain, said read request queue storing read requests directed to the external memory/device expected to be connected to said port, said read request queue transmitting read requests to the external memory/device expected to be connected to said port via said application unit interface following acknowledgement of receipt of a last previous command.

5. The data transfer controller of claim 1, wherein:
said predetermined set of interface signal lines includes
a command valid signal line driven by said hub interface unit indicating that a valid command is being transmitted,
at least one command signal line driven by said bus interface unit indicating at least one command,
a command acknowledge signal line driven by said application unit interface indicating receipt of a command on said at least one command signal line.

6. The data transfer controller of claim 5, wherein:
said at least one command signal line includes a read command signal line indicating a read request for reading data from the external memory/device expected to be connected to said corresponding application unit interface.

7. The data transfer controller of claim 5, wherein:
said at least one command signal line includes a write command signal line indicating a write request for writing data to the external memory/device expected to be connected to said corresponding application unit interface.

8. The data transfer controller of claim 1, wherein:
said predetermined set of interface signal line s includes
at least one application unit data size line driven by said application unit interface.indicating the maximum size of data words accepted by the external memory/device expected to be connected to said port; and
wherein said data transfer hub transmits data to and from said corresponding port in data words having a length not greater than said indication of said at least one application unit data size line.

9. The data transfer controller of claim 8, wherein:
said predetermined set of interface signal lines further includes
a plurality of data lines divided into a plurality of data line groups,
at least one data strobe signal line equal in number to a number of data line groups of said plurality of data lines, each data strobe indicating whether a corresponding data line group is employed in a current data transfer.

10. The data transfer controller of claim 9, wherein:
said plurality of data lines includes a plurality of read data lines driven by said application unit interface upon transfer of data from the external memory/device expected to be connected to said corresponding application unit interface; and
said at least one data strobe signal line includes a plurality of read strobe lines driven by said hub interface unit.

11. The data transfer controller of claim 10, wherein:
said plurality of read data lines consists of 32 data lines divided into four groups of 8 data lines each; and
said plurality of read strobe lines consists of four read data strobe lines.

12. The data transfer controller of claim 9, wherein:
said plurality of data lines includes a plurality of write data lines driven by said hub interface unit upon transfer of data to the external memory/device expected to be connected to said corresponding application unit interface; and
said at least one data strobe signal line includes a plurality of write strobe lines driven by said hub interface unit.

13. The data transfer controller of claim 12, wherein:
said plurality of write data lines consists of 32 data lines divided into four groups of 8 data lines each; and
said plurality of write strobe lines consists of four read data strobe lines.

14. A data processing system comprising:
a plurality of data processors, each data processor capable of generating a data transfer request specifying a data source, a data destination and a data quantity to be transferred;
a data transfer hub connected to said plurality of data processors to dispatch data transfer requests;
a plurality of ports each connected to said data transfer hub and including
an hub interface unit connected to said data transfer hub, said hub interface unlit for each port being identically configured, and
an application unit interface connected to said corresponding hub interface unit and configured for an external memory/device expected to be connected to said port, said hub interface unit and said application unit interface operatively connected; for data transfer therebetween by a predetermined set of interface signal lines identical for all ports; and
said data transfer hub controlling data transfer from a source port corresponding to said data source to a destination port corresponding to said data destination in a quantity corresponding to said data quantity to be transferred of a currently executing data transfer request.

15. The data processing system of claim 14, wherein:
each of said data processors and said data transfer hub are clocked at first frequency;
said application unit interface of each of said plurality of ports is clocked at second frequency corresponding to the external memory/device expected to be connected to said port; and
said hub interface unit of each of said plurality ports includes
a first clock domain clocked at said first frequency,
a second clock domain clocked at said second frequency of said corresponding application unit interface, and
a synchronizer connected to said first clock domain and said second clock domain operative to synchronize signals passing between said first clock domain and said second clock domain.

16. The data processing system of claim 15, wherein:
said hub interface unit further includes a write request queue disposed in said first clock domain, said write request queue storing write requests directed to the external memory/device expected to be connected to said port, said write request queue transmitting write requests to the external memory/device expected to be connected to said port via said application unit interface following acknowledgement of receipt of a last previous command.

17. The data processing system of claim 15, wherein:
said hub interface unit further includes a read request queue disposed in said first clock domain, said read request queue storing read requests directed to the external memory/device expected to be connected to said port, said read request queue transmitting read requests to the external memory/device expected to be connected, to said port via said application unit interface following acknowledgement of receipt of a last previous command.

18. The data processing system of claim 14, wherein:
said predetermined set of interface signal lines includes
a command valid signal line driven by said hub interface unit indicating that a valid command is being transmitted,
at least one command signal line driven by said bus interface unit indicating at least one command,
a command acknowledge signal line driven by said application unit interface indicating receipt of a command on said at least one command signal line.

19. The data processing system of claim 18, wherein:
said at least one command signal line includes a read command signal line indicating a read request for reading data from the external memory/device expected to be connected to said corresponding application unit interface.

20. The data processing system of claim 18, wherein:
said at least one command signal line includes a write command signal line indicating a write request for writing data to the external memory/device expected to be connected to said corresponding application unit interface.

21. The data processing system of claim 14, wherein:
said predetermined set of interface signal lines includes
at least one application unit-data size line driven by said application unit interface indicating the maximum size of data words accepted by the external memory/device expected to be connected to said port; and
wherein said data transfer hub transmits data to and from said corresponding port in data words having a length not greater than said indication of said at least one application unit data size line.

22. The data processing system of claim 21, wherein:
said predetermined set of interface signal lines further includes
a plurality of data lines divided into a plurality of data line groups,
at least one data strobe signal line equal in number to a number of data line groups of said plurality of data lines, each data strobe indicating whether a corresponding data line group is employed in a current data transfer.

23. The data processing system of claim 22, wherein:
said plurality of data lines includes a plurality of read data lines driven by said application unit interface upon transfer of data from the external memory/device expected to be connected to said corresponding application unit interface; and said at least one data strobe signal line includes a plurality of read strobe lines driven by said hub interface unit.

24. The data processing system of claim 23, wherein:

said plurality of read data lines consists of 32 data lines divided into four groups of 8 data lines each; and said plurality of read strobe lines consists of four read data strobe lines.

25. The data processing system of claim 22, wherein:

said plurality of data lines includes a plurality of write data lines driven by said hub interface unit upon transfer of data to the external memory/device expected to be connected to said corresponding application unit interface; and said at least one data strobe signal line includes a plurality of write strobe lines driven by said hub interface unit.

26. The data processing system of claim 25, wherein:

said plurality of write data lines consists of 32 data lines divided into four groups of 8 data lines each; and said plurality of write strobe lines consists of four read data strobe lines.

27. The data processing system of claim 14 wherein:

said plurality of data processors, said data transfer hub and each of said plurality of ports are disposed on a single integrated circuit.

\* \* \* \* \*